ered on a magnetic disk and a timing signal recording system for recording the timing signals on the magnetic disk. Timing signals are identified by a detection circuit in response to a pulse generated by a pulse generator responsive to revolution speed of the magnetic disk and the servo signals are extracted based on the timing signal as a reference, then the various signals for read/write operation, e.g. sector mark signal are generated based on the extracted servo signal. The timing signals are recorded with a single feed quantity smaller than a track width by means of a timing signal recording system having a incrementally movable mechanism for a head and a recording circuit for recording timing signals at respective stop positions.

United States Patent [19]
Sano et al.

[11] Patent Number: 5,164,866
[45] Date of Patent: Nov. 17, 1992

[54] TIMING SIGNAL RECORDING SYSTEM OF A MAGNETIC DISK APPARATUS

[75] Inventors: Tadashi Sano, Yokosuka; Fumio Ogaswawara, Yokohama; Junichi Ogura, Oiso; Hideo Nomura, Yokohama, all of Japan

[73] Assignee: Victor Company of Japan, Ltd., Yokohama, Japan

[21] Appl. No.: 742,336

[22] Filed: Aug. 8, 1991

Related U.S. Application Data

[60] Division of Ser. No. 653,756, Feb. 11, 1991, which is a continuation of Ser. No. 195,980, May 19, 1988, abandoned.

[30] Foreign Application Priority Data

May 20, 1987 [JP] Japan .................. 62-123102
May 20, 1987 [JP] Japan .................. 62-123103

[51] Int. Cl.$^5$ .............................. G11B 5/09
[52] U.S. Cl. ................... 360/77.08; 360/51
[58] Field of Search .................. 360/77.08, 51

[56] References Cited

U.S. PATENT DOCUMENTS 4,910,617 3/1990 Brunnett et al. .......... 360/77.08

FOREIGN PATENT DOCUMENTS

61-242481 10/1986 Japan .
62-246184 10/1987 Japan .

Primary Examiner—Vincent P. Canney
Attorney, Agent, or Firm—Jacobson, Price, Holman & Stern

[57] ABSTRACT

A timing control method and system for performing recording/reproducing operation using timing signals and servo signals prerecorded on a magnetic disk and a timing signal recording system for recording the timing signals on the magnetic disk. Timing signals are identified by a detection circuit in response to a pulse generated by a pulse generator responsive to revolution speed of the magnetic disk and the servo signals are extracted based on the timing signal as a reference, then the various signals for read/write operation, e.g. sector mark signal are generated based on the extracted servo signal. The timing signals are recorded with a single feed quantity smaller than a track width by means of a timing signal recording system having a incrementally movable mechanism for a head and a recording circuit for recording timing signals at respective stop positions.

3 Claims, 11 Drawing Sheets

FIG. 11A  READ/WRITE AMP. REPRODUCED OUTPUT Sout

FIG. 11B  SERVO GATE PULSE P_G   "H" LEVEL / "L" LEVEL

FIG. 11C  TRACKING SERVO SIGNAL S_TR

FIG. 12A  S_P

FIG. 12B  Sout — TIMING SIGNAL S_T / NO SIGNAL / SERVO SIGNAL S_S / DATA SIGNAL S_D

← TIMING FOR HEADER →

FIG. 20E  
FIG. 20F

DIGITAL VALUE

TIMING SIGNAL RECORDING SYSTEM OF A MAGNETIC DISK APPARATUS

This is a division of application Ser. No. 07/653,756 filed Feb. 11, 1991, which in turn is a continuation of application Ser. No. 07/195,980, filed on May 19, 1988, now abandoned.

BACKGROUND OF THE INVENTION

This invention relates to a timing control method used in a magnetic recording and reproducing apparatus such as a hard disk drive, and more particularly to a method capable of extracting servo signals in the sector servo system at a precise timing and capable of effecting recording and reproduction of data signals at a precise timing.

Further, this invention is concerned with an apparatus capable of recording timing signals from which the above-mentioned servo signals can be derived with magnetization inversion phases aligned with each other on a magnetic disk.

Figure 1:
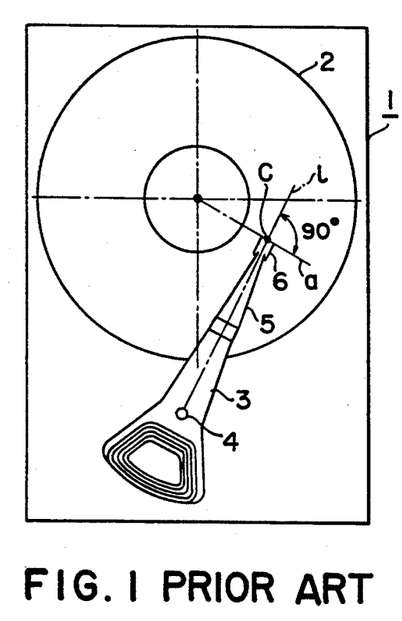
FIG. 1 is a schematic plan view showing an access mechanism of a conventional magnetic disk drive.

In general, as shown in FIG. 1, in a magnetic disk drive, a head arm 3 is rotated about a pivot 4 while revolving a rigid magnetic disk 2 accommodated within a housing 1 at a high speed to move a magnetic head 6 secured to the front end of the head arm 3 through a gimbal arm 5 to a predetermined position of the magnetic disk, thus to record and reproduce various information signals recorded in a form of concentric or helical tracks.

Recently, in the magnetic recording/reproducing apparatus, high density recording systems have been increasingly developed, and consequently higher tracking accuracy is demanded, because of an increase in the track density.

Specifically, there is known a tracking servo system including speed control and positioning control of the magnetic head performed so that the magnetic head is precisely subjected to on-track with respect to a track to be accessed which is formed on the disk surface. See Japanese Laid-open Patent Application No. 242381/1986 previously filed by the applicant of this application. In accordance with this method, a disk-shaped magnetic scale having N-poles and S-poles magnetized alternately at a predetermined pitch on its outer periphery is integrally fitted over the revolving shaft of the access motor for moving the magnetic head in a radial direction of the disk. A sensor using an MR (Magneto-Resistance effect) element is disposed in the vicinity of the outer periphery of the scale to successively sense a position of the magnetic head in the radial direction of the disk, a distance (the number of tracks) between a current position track and a target position track for the magnetic head, to control a moving speed of the magnetic head on the basis of an output from the sensor. In other words, speed control and positioning control of the magnetic head are performed in dependence upon the results sensed.

However, in the tracking servo using such MR element and external magnetic scale, it is difficult to control the magnetic head to converge on the target track. Often an "off track" occurs such that the track center based on the output sensed and the actual track center of the disk do not coincide with each other by changes in temperature, leading to the possibility of failure to correctly read and write intended signals.

To overcome this, a sector servo system as disclosed in the Japanese Laid-open Patent Application No. 246184/1987 filed by the applicant of this application has been proposed, in which servo signals for tracking servo are recorded in advance on a magnetic disk, thus to record a data signal on a desired track or reproduce the recorded data signal therefrom while reproducing the servo signals.

Figure 2:
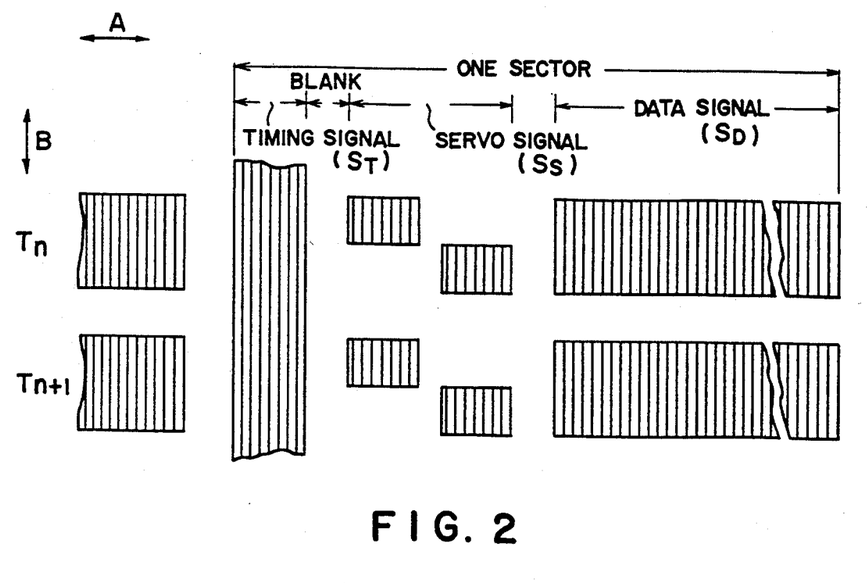
FIG. 2 is an explanatory view showing a signal recording on a known disk surface in a sector servo configuration.

In such a sector servo system, a timing signal $S_T$ shown in FIG. 2 is lacking, and, servo signals are recorded corresponding to both sides of each track center of tracks Tn and Tn+1 and positions of which along the respective track is shifted to each other in a direction of the time base (in a circumferential direction). Recording level of these servo signals is kept constant, so that tracking servo is carried out by moving the magnetic head so as to reproduce these servo signals at equal levels between the two adjacent servo signals on both sides of each track center.

Namely, servo signals $S_S$ and data signals $S_D$ are recorded repeatedly in a direction direction indicated by an arrow A on the magnetic disk, thus to form concentric tracks Tn and Tn+1.

As shown in FIG. 2, the two adjacent servo signals are also shifted in a traverse direction of the track i.e., the direction indicated by an arrow B.

In this example, as shown in FIG. 2, one sector is formed by servo signals $S_S$ and data signal $S_D$.

In such a sector servo system, the servo signals $S_S$ are extremely important. If the timing for extracting the reproduced output of the servo signal from the reproduced output from the magnetic head has undesirable error, precise tracking could not be conducted.

Since such servo signals $S_S$ are positioned at the head portion of each sector, servo areas where servo signals $S_S$ are recorded and data areas where data signals $S_D$ are recorded are positioned alternately in a direction with respect to the time base.

Accordingly, if the recording timing of the data signals is erroneously shifted, there is the possibility that any servo signal $S_S$ would be erased missing by the over-writing of the data signal $S_D$.

In such a case, accurate tracking also could not be conducted.

To overcome this, there has been proposed a system to control the timings for recording data signals and extracting servo signals with an output of an FG (frequency generator) or a sensor output of a rotational angle sensor provided on the spindle motor, which spindle motor serves as a reference. Another system has been proposed in which a high frequency signal of which timing is detectable for recording servo signals is recorded in advance along a predetermined track provided on the whole periphery of the data signal recording area using an exclusive clock head provided independently of the read/write head, thus to control the recording timing of the servo signals. The high frequency signal serves as a timing reference.

However, in the case of conducting timing control on the basis of the above-mentioned sensor output, etc., precise timing control is difficult resulting in that the reproduction of servo signals recorded on the disk and the sensor outputs cannot be achieved by eneven thermal expansion of the magnetic disk or of the arm for supporting the magnetic head resulting from changes in temperature, and jitter caused in the waveform shaping circuit.

Further, where a known system in which a timing detectable signal (high frequency signal) recorded on the magnetic disk is employed, there is a problem that it is difficult to discriminate between the timing detectable signal and data signals at the time of movement of the head, failing to effect a secure timing control.

Furthermore, since the clock head is unnecessary after servo signal has been recorded, it is necessary to remove this expensive clock head in the clean room after use. This is not preferable in light of the increased work hours within a clean room.

In addition, space must be provided for the clock head and for its removal. This is not preferable in view of miniaturization of the apparatus.

Further, since the clock head is expensive, it raises the production cost.

There is another system known to the applicant which is shown in FIG. 2, where timing signals (headers) $S_T$ for adjusting starting positions of respective sectors are recorded in a radial direction on the magnetic disk. The timing signals $S_T$ serve as references. Servo signals $S_S$ and data signals $S_D$ are successively recorded in a direction of time base (in a direction indicated by the arrow A).

In a condition where the magnetic disk is stopped at a predetermined angular position, such timing signals $S_T$ are recorded while intermittently feeding the magnetic head by using a linear motor, etc. by a predetermined interval x ($x \geq$ track width $T_W$) in the radial direction (in the direction indicated by the arrow B).

Figure 3:
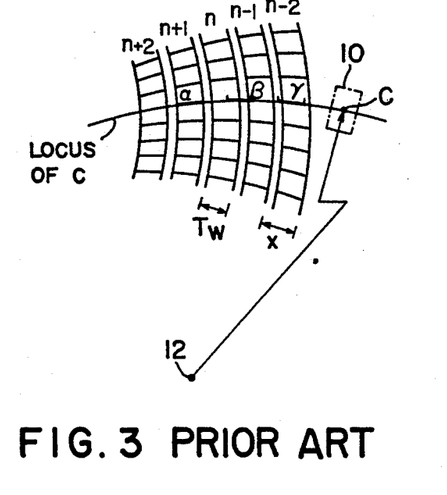
FIG. 3 is a view showing a magnetization inversion pattern of timing signal $S_T$ recorded on a magnetic disk.

Meanwhile, in the case where the above-mentioned timing signals $S_T$ are recorded with an apparatus in which a line l, which connects the center C of the read/write gap of the magnetic head 6 and the pivot 4, and the read/write gap (parallel with the line a in the figure) are perpendicular to each other as shown in FIG. 1, such timing signals $S_T$ are recorded as a magnetization inversion pattern as Shown in FIG. 3.

Figure 4:
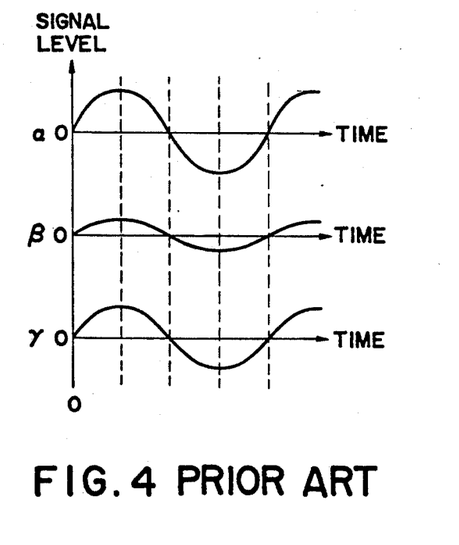
FIG. 4 is a graph showing a reproduced output of the timing signal in FIG. 3.

Thus, where the timing signals $S_T$ having been recorded with such an apparatus are reproduced, reproduced outputs having the same phase can be obtained irrespective of the position of the magnetic head as shown in FIG. 4.

However, when the magnetic head 6 is positioned on the innermost peripheral track and the outermost peripheral track, it is difficult to obtain a stable floating function of the magnetic head 6 resulting from the fact that yaw angle becomes too large, making it difficult to obtain good reproduced signals.

Further, there occurs the problem that the output value (peak level) of the reproduced signal varies in dependence upon the position of the magnetic head 6 with respect to each track as shown in FIGS. 3 and 4.

Figure 5:
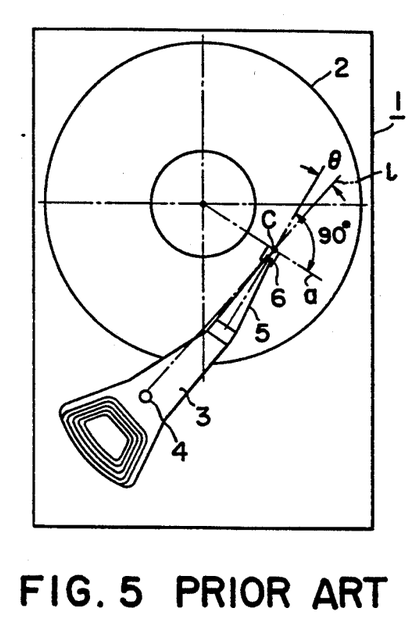
FIG. 5 is a view showing an arrangement of a head in which yaw angle is reduced, which is conventionally used.

On the other hand, as shown in FIG. 5, by employing a mechanism such that a line l, which connects the center C of the read/write gap of the magnetic head 6 and the pivot 4, and the read/write gap are caused to have an inclination at an offset angle $\theta$, it is possible to decrease the yaw angle.

Figure 6:
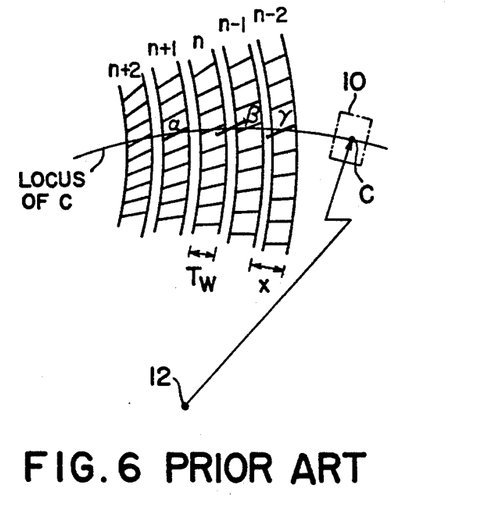
FIG. 6 is a view showing a magnetization inversion pattern of timing signals recorded on a magnetic disk by using the mechanism of FIG. 5.
Figure 7:
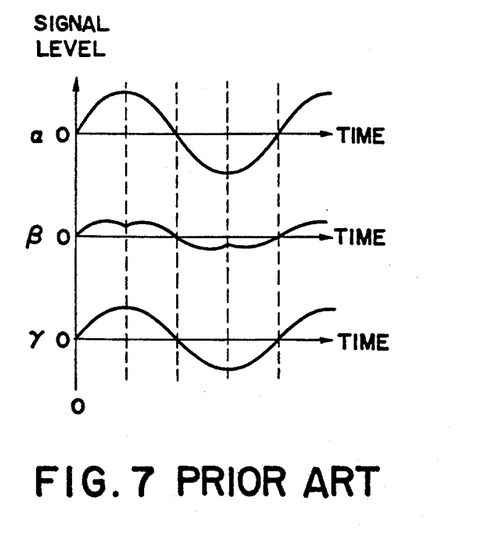
FIG. 7 is a graph showing reproduced outputs of the timing signals in FIG. 6.

However, in the case of recording timing signals $S_T$ with such an apparatus, timing signals $S_T$ are recorded as a magnetization inversion pattern as shown in FIG. 6, with the result that the waveform of the reproduced output thereof varies depending upon the position of the magnetic head 6 with respect to each track as shown in FIGS. 6 and 7.

Thus, such an apparatus has the problem that an electronic processing circuit for smoothing the waveform is specially required.

A further problem is that since movement in a radial direction of the head for writing timing signals is carried out under the condition where the housing of the magnetic disk apparatus is removed, such a writing operation must be conducted within a clean room, resulting in an increase in assembly cost.

SUMMARY OF THE INVENTION

An object of this invention is to provide a method to precisely and securely control timings for extracting servo signals in a magnetic disk apparatus.

Another object of this invention is to provide a method to precisely and securely control timings for recording and reproducing data signals in a magnetic disk apparatus.

A further object of this invention is to provide an apparatus capable of recording timing signals of which magnetization phases are in alignment with each other.

A still further object of this invention is to provide a timing signal writing apparatus capable of writing servo signals even outside a clean room.

Still more other objects of this invention and advantages obtained therewith will become apparent from detailed preferred embodiments with reference to the attached drawings.

In accordance with this invention, there is provided a timing control method in a magnetic recording and reproducing apparatus for effecting transmission and reception of timing signals, servo signals and data signals, to and from a magnetic disk on which these signals are recorded repeatedly in succession, the method comprising: a stage for detecting a pulse signal generated corresponding to the revolution of said magnetic disk; a stage for identifying a timing signal which is reproduced immediately after said pulse signal is detected; a stage for generating servo gate pulses for extracting servo signals using said identified timing signal as a reference timing; and a stage for generating a sector mark signal indicating the beginning of a data area into which said data signal is recorded and a stage for determining timings for extraction of the servo signals and for recording and reproduction of the data signals using respectively the generated servo gate pulses and sector mark signal.

Further, there is provided a recording and reproduction time-control system for a magnetic disk recording and reproducing apparatus which effects transmission and reception of timing signals, servo signals and data signals to and from a magnetic disk on which said timing signals and said servo signals are prerecorded in succession, and said data signals are subject to recording and reproduction on and from a data area located adjacent an area where said servo signals on each track of concentric tracks are recorded on said magnetic disk, said system comprising: means for recording the data signals; means for reproducing the timing signals, servo signals and the data signals and outputting them as a reproduced signal; a pulse generator for outputting a pulse signal corresponding to the revolution of said magnetic disk; a timing signal detection circuit for detecting a timing signal in said reproduced signal immediately after said pulse signal is reproduced in response to the outputted pulse signal from said pulse generator; means for generating servo gate pulses responsive to the detected timing signal with a predetermined time delay;

means for generating a sector mark signal responsive to the detected timing signal with a predetermined time delay, said sector mark signal indicating a beginning of the data area into which said data signal is recorded and from which it is reproduced; means for demodulating said servo signals responsive to said servo gate pulses; means for demodulating said data signals from the reproduced signal responsive to said sector mark signal so that reproduction of the data signals from said data area is time-controlled; and means for controlling said recording means responsive to said pulse signal and said sector mark signal so that recording of the data signals in said data area is time-controlled.

Because the servo gate pulse and the sector mark signal are generated based on the revolution of the magnetic disk, and the servo signal extraction timing and the data signal read/write timing are determined by the servo gate pulse and the sector mark signal, a precise and secure timing control is realized without being subjected to fluctuation or change, even when thermal expansion or contraction of the magnet disk, or the like occurs.

Further, the margin for servo signals can be made less because of accurate servo gate timing.

Still further, since prohibition for recording is performed based on signals recorded on the disk, the servo signals recorded on the disk can be securely protected.

In addition, there is provided a timing signal recording system for a magnetic disk apparatus for moving a magnetic head in a radial direction of a magnetic disk by rotating a head arm having said magnetic head affixed to the front end thereof with a pivot being as center, and for recording signals on said magnetic disk and reproducing them therefrom by said magnetic head, said timing signals being prerecorded on the magnetic disk as reference for sector servo control, said system comprising: means for incrementally moving said magnetic head with a single feed quantity being as a predetermined quantity smaller than a track width; and means for recording timing signals at respective stop positions of said magnetic head, thus to record in advance the timing signals successively in a radial direction of said magnetic disk.

In accordance with the timing signal recording apparatus as stated above, recording of timing signals, achieves precise output waveforms even if the read/write gap and the line connecting the center of the read/write gap to the pivot are not perpendicular to each other.

Further, since the degree of freedom for yaw angle correction become large, the dead space within the housing can be decreased.

BRIEF DESCRIPTION OF THE DRAWINGS

In the accompanying drawings:

FIG. 20A through H is a diagram showing the manner of examining signals recorded by the arrangement of FIGS. 17 and 18.

DESCRIPTION OF THE PREFERRED EMBODIMENT

FIG. 2 shows a signal recording pattern on the disk surface applicable to this invention where timing signal $S_T$, then spaced by a blank Bk, servo signals $S_S$ and data signals $S_D$ are successively recorded in a direction with respect to the time base, i.e. the direction indicated by the arrow A. This signal recording pattern is repeated along each track Tn and Tn+1.

Figure 8:
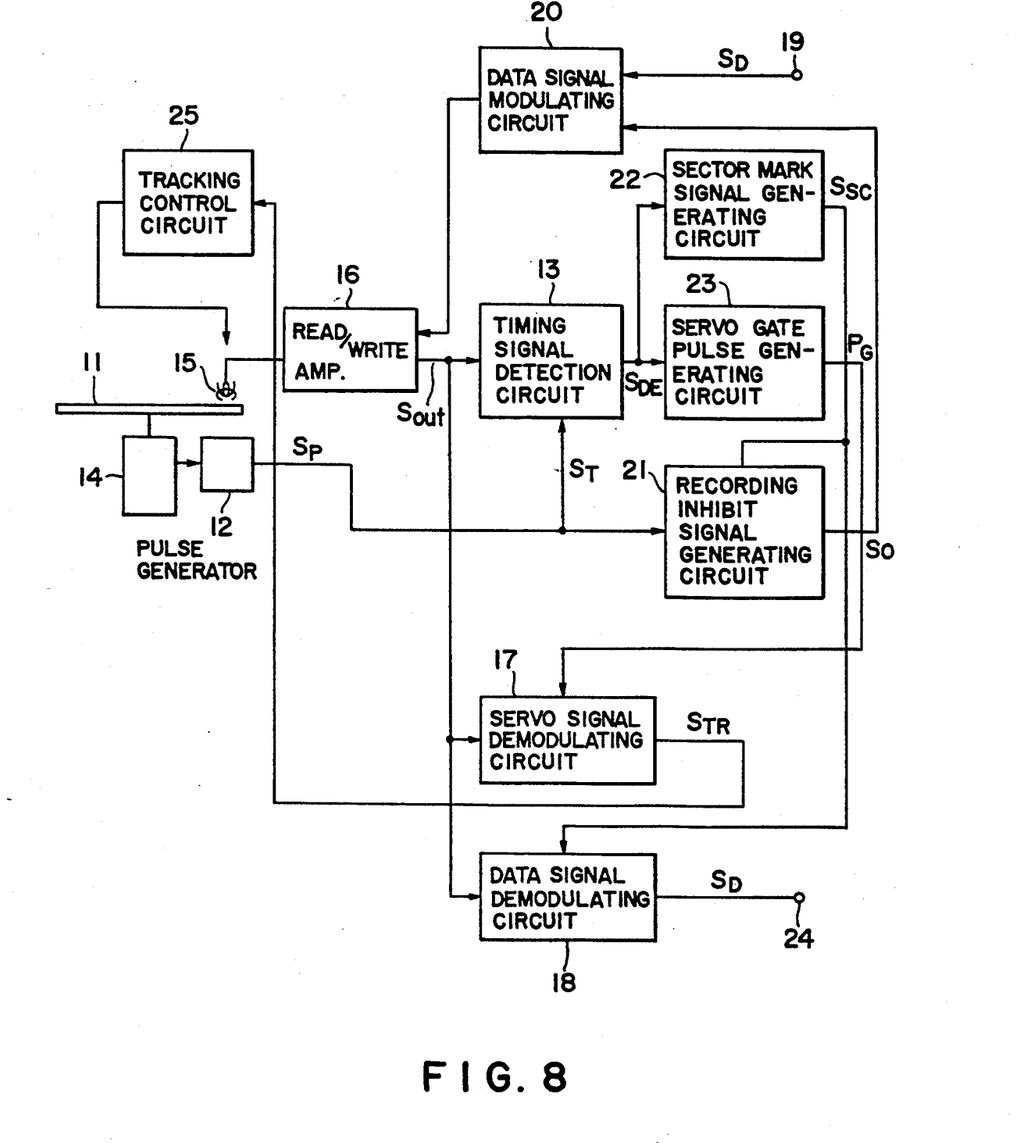
FIG. 8 is a block diagram showing the essential part of a magnetic recording and reproducing apparatus for realizing a timing control method according to this invention.

FIG. 8 is a block diagram showing the essential part of a magnetic recording and reproducing apparatus for realizing a timing control method according to this invention.

A magnetic disk 11 is revolved by a spindle motor 14 at a predetermined speed and transmission and reception of signals to and from the magnetic disk 11 are conducted through a read/write head 15 and a read/write amplifier 16.

A reproduced output $S_{out}$ from the read/write amplifier 16 is delivered to a timing signal detection circuit 13, a servo signal demodulating circuit 17, and a data signal demodulating circuit 18. A data signal $S_D$ incoming through an input terminal 19 is modulated by a data signal modulating circuit 20. The modulated data signal thus obtained is delivered to the read/write amplifier 16.

A pulse generator 12 is provided in association with the spindle motor 14. This pulse generator 12 serves to deliver a pulse signal $S_P$ corresponding to revolution of the spindle motor 14 to the timing signal detection circuit 13 and to a recording inhibit signal generating circuit 21.

An output detected $S_{DE}$ based on the timing signal $S_T$ which has been detected by the timing signal detection circuit 13 is delivered to a sector mark signal generating circuit 22 and to a servo gate pulse generating circuit 23. These generating circuits 22 and 23 serve to generate and output a sector mark signal $S_{SC}$ indicating the beginning or start of the data area and a servo gate pulse $P_G$ delivered from the detection output signal $S_{DE}$ for extracting the servo signal $S_S$ included in the reproduced output $S_{out}$ based on the timing signal $S_T$ serving as a reference timing, respectively.

The sector mark signal $S_{SC}$ is delivered to the recording inhibit signal generating circuit 21 and to the data signal demodulating circuit 18. A recording inhibit signal $S_O$ generated by the recording inhibit signal generating circuit 21 is delivered to the data signal modulating circuit 20, thus to control the timing for recording the data signal $S_D$ on the magnetic disk.

The data signal demodulating circuit 18 is constituted so that the timing for demodulating the data signal $S_D$ is controlled by the sector mark signal $S_{SC}$. The demodulated data signal $S_D$ is delivered to a host equipment (not shown) through an output terminal 24.

On the other hand, the servo gate pulse $P_G$ is delivered to the servo signal demodulating circuit 17. This servo signal demodulating circuit 17 serves to extract the servo signal $S_S$ with the servo gate pulse $P_G$ delivered serving as a window to generate a tracking servo signal $S_{TR}$.

This tracking servo signal $S_{TR}$ is delivered to a tracking control circuit 25 to drive an actuator (not shown) to effect tracking of the read/write head 15.

Figure 9:
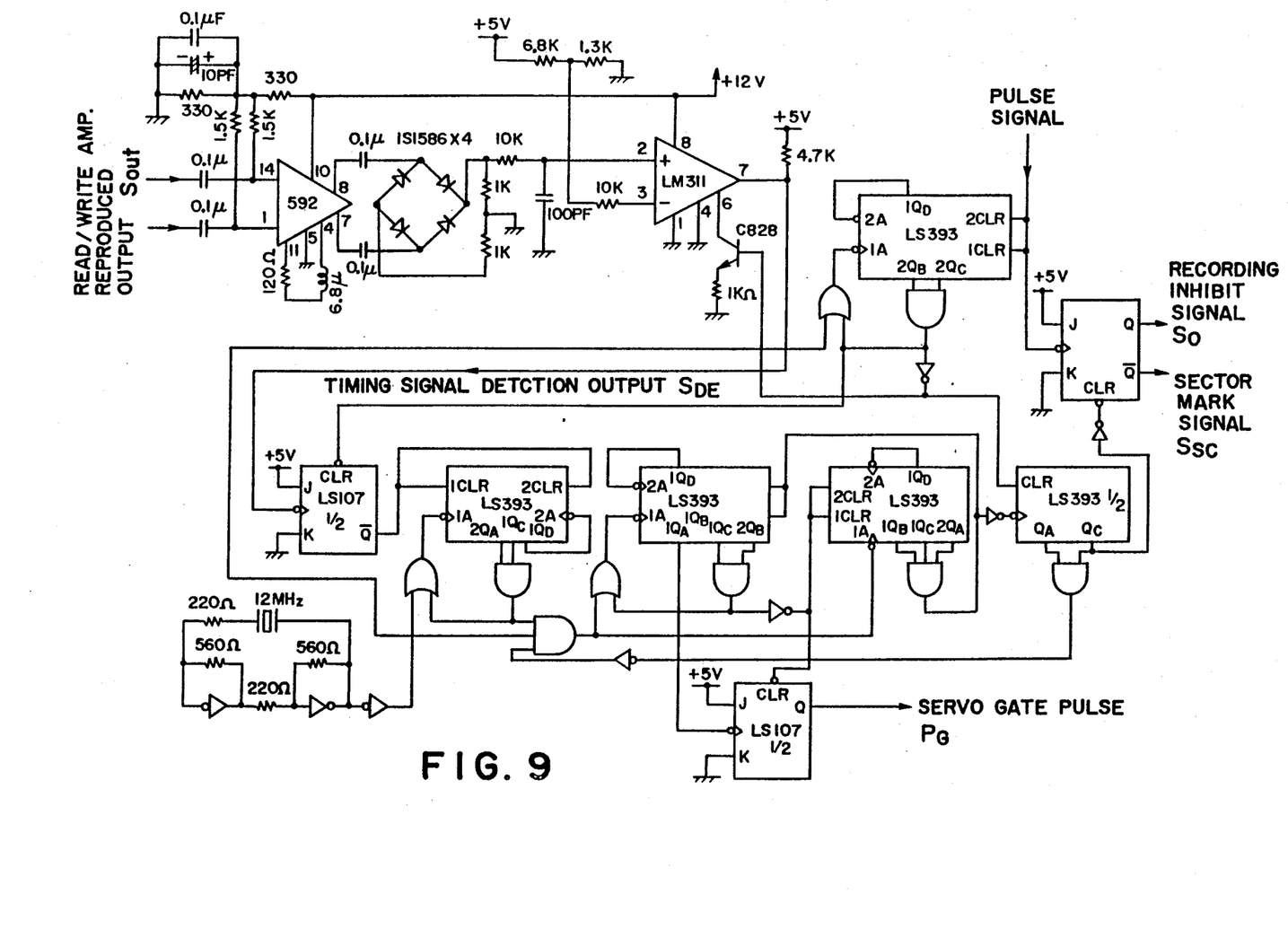
FIG. 9 is a circuit diagram showing an arrangement of a portion of the apparatus of FIG. 8.

FIG. 9 is a detailed circuit diagram showing the arrangement of the timing signal detection circuit 13, the sector mark signal generating circuit 22, the servo gate pulse generating circuit 23, and the recording inhibit signal generating circuit 21. All ICs used in this circuit are known ones and are available from Texas Instrument Inc., etc.

Figure 10:
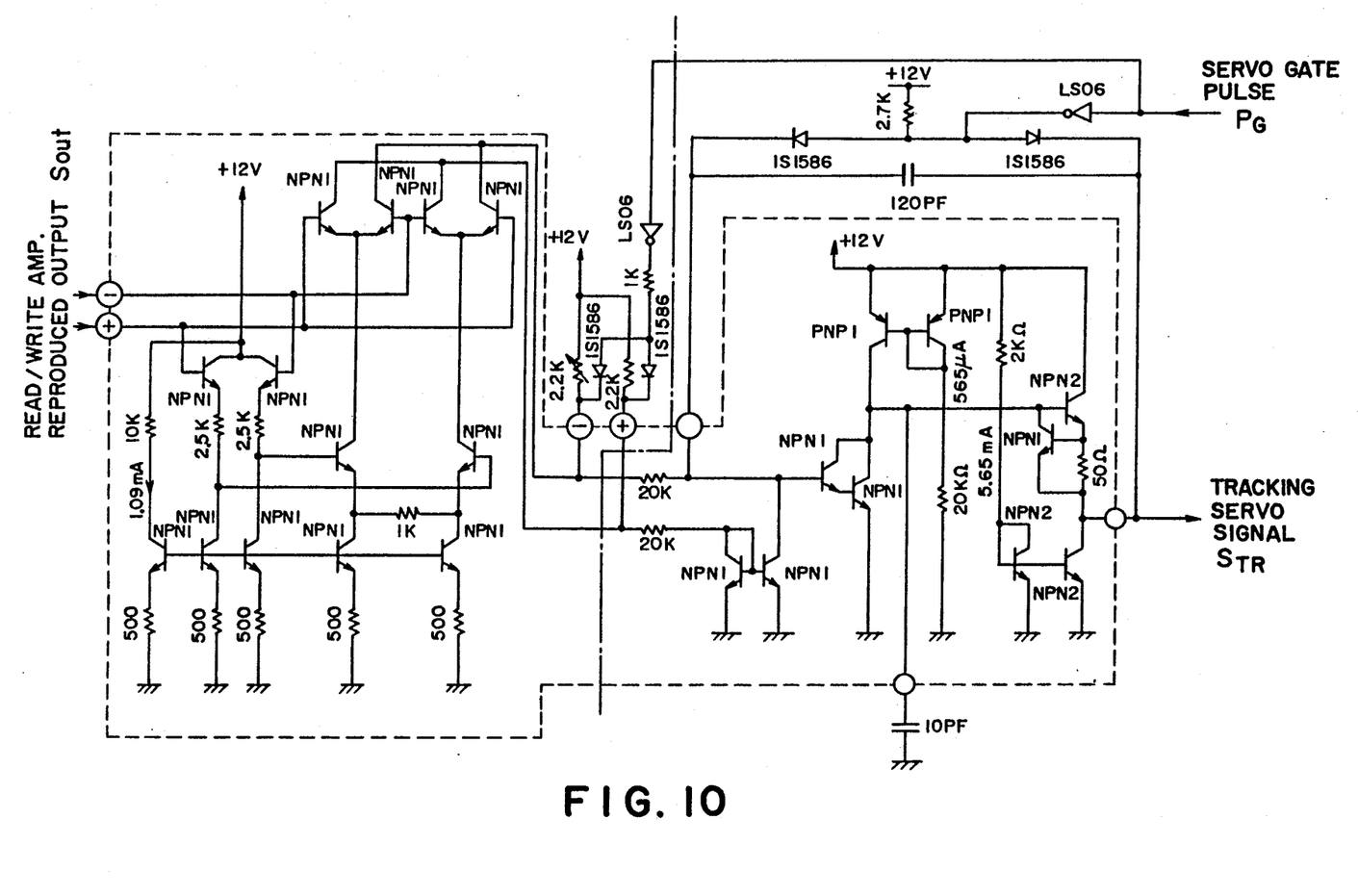
FIG. 10 is a circuit diagram showing an arrangement of another portion of the apparatus of FIG. 8.
Figure 11A:
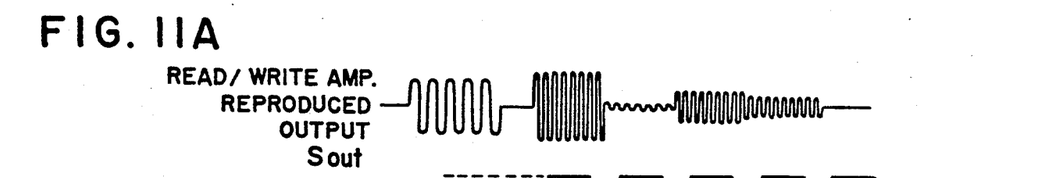
FIG. 11A, B and C is a waveform diagram showing the operation in FIG. 10.
Figure 11B:
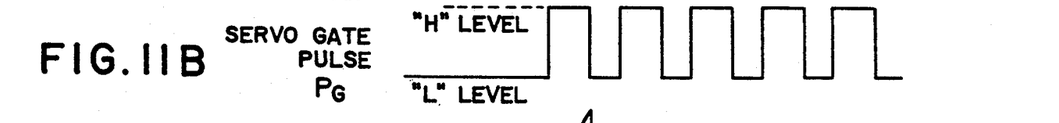
Figure 11C:
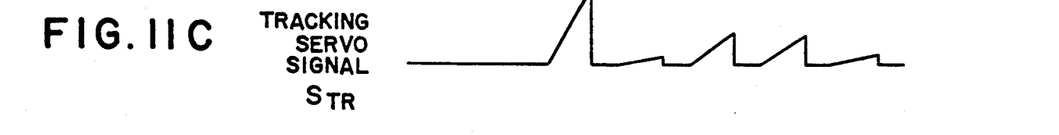

FIG. 10 is a circuit diagram showing the arrangement of servo signal demodulating circuit 17. As separated by alternate long and short dash line, this circuit is comprised of a full-wave rectification unit of the left half and an integration unit of the right half. As shown in FIG. 11, read/write amplifier reproduced output $S_{OUT}$ (FIG. 11A) is subjected to full-wave rectification only for a time period during which the servo gate pulse $P_G$ (FIG. 11B) is at H level. Thus, the waveform integrated is output as a tracking servo signal $S_{TR}$ (FIG. 11C).

For the tracking control circuit 25, known ICs, e.g., SSI 32H568 Servo Controller and SSI 32H569 Servo Motor Driver by Silicon Systems Company may be used. Further, for the read/write amplifier 16, known IC, e.g., SSI 501/501R by Silicon Systems Company may be used. This circuit is provided with an R/$\overline{\text{w}}$ terminal as a switching input terminal for read/write operations, which responds to a recording inhibit signal generated from the recording inhibit signal generating circuit 21 supplied thereto through the data signal modulating circuit 20 to force the R/$\overline{\text{w}}$ terminal to H level, thus preventing it from being placed in a recording state.

For the data signal modulating circuit 20 and the data signal demodulating circuit 18, known IC, e.g., DP 8462 2, 7 Code Data Synchronizer by National Semiconductor Corp. may be used. This circuit is constituted so that demodulation of data is initiated by controlling a read gate terminal of the IC by using a sector mark signal $S_{SC}$ generated from the sector mark signal generating circuit 22.

Figures 12A, 12B:
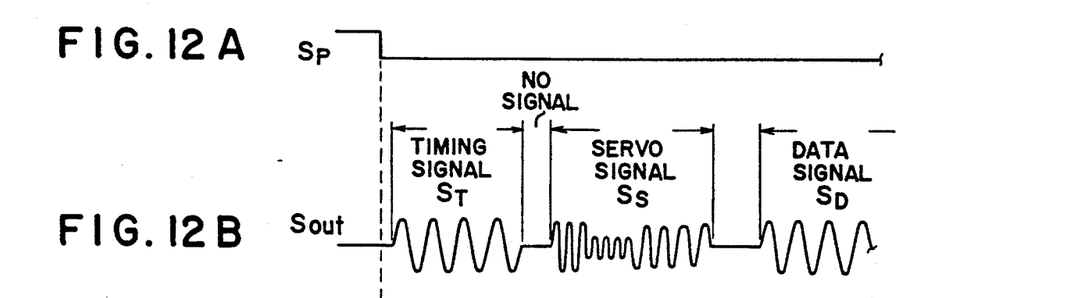
FIG. 12A through F is a waveform diagram showing the operation of the apparatus in FIG. 8.

In the magnetic recording/reproducing apparatus as constructed above, a pulse signal $S_P$ falling immediately before the beginning of each sector is generated from the pulse generator 12 as shown in FIG. 12A.

The reproduced output $S_{OUT}$ from the read/write amplifier 16 varies as shown in FIG. 12B. Namely, timing signal $S_T$, servo signal $S_S$ and data signal $S_D$ are reproduced in succession subsequently to the rise of the pulse signal $S_P$.

Figure 12C:
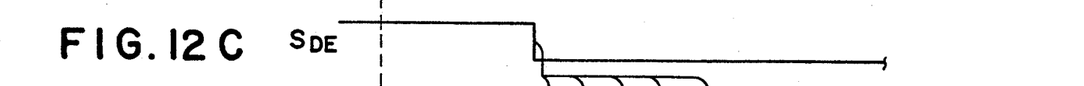

The timing signal detection circuit 13 identifies a signal delivered immediately after the fall of the pulse signal $S_P$ as a timing signal $S_T$, to generate an output detected signal $S_{DE}$ as shown in FIG. 12C in the no-signal period immediately after the timing signal $S_T$.

Figure 12D:
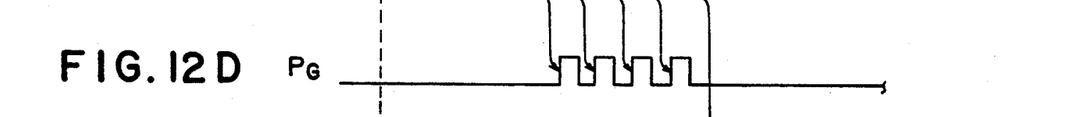

The servo gate pulse generating circuit 23 generates a series of servo gate pulses as shown in FIG. 12D, a first gate pulse of which rises after a predetermined time from the timing at which the output detected $S_{DE}$ falls with such a fall timing serving as a reference. The servo signal $S_S$ in the reproduced output $S_{OUT}$ is extracted by the servo signal demodulating circuit 17 with the servo gate pulse $P_G$ serving as a window. In the circuit of FIG. 9, five PG pulses are generated. However, the last PG pulse is omitted in FIG. 12D, because it is used only for starting the integration unit shown in FIG. 10.

Figure 12E:
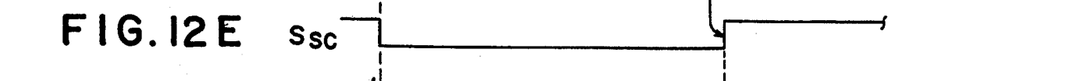

The sector mark signal generating circuit 22 generates a sector mark signal $S_{SC}$ as shown in FIG. 12E which rises after a predetermined time with respect to the timing at which the output detected $S_{DE}$ falls, serving as a reference.

Thus, the data signal demodulating circuit 18 judges the reproduced output delivered after the sector mark signal $S_{SC}$ has risen as a data signal $S_D$ to demodulate it, thus to output the demodulated data signal $S_D$.

Figure 12F:
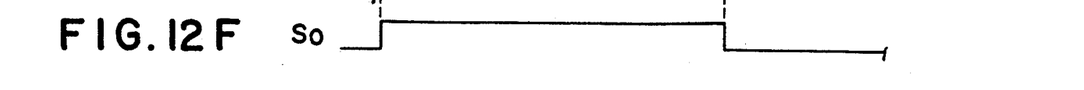

On the other hand, as shown in FIG. 12F, the recording inhibit signal generating circuit 21 generates a recording inhibit signal $S_O$ which rises at the timing of the fall of the pulse signal $S_P$ and falls at the timing of the rise of the sector mark signal $S_{SC}$ to inhibit recording for a time period during which the recording inhibit signal $S_O$ is high, and for the time period during which the timing signal $S_T$ and the servo signal $S_S$ are being reproduced, thus to protect them from being erased. This secures the area where the timing signal $S_T$ and the servo signal $S_S$ are to be recorded.

As just described above, since the magnetic recording/reproducing apparatus according to this embodiment is adapted to generate a servo gate pulse $P_G$ and a sector mark signal $S_{SC}$ at the timing based on the detected timing signal $S_T$ recorded on the magnetic disk 11 serving as a reference timing, the timings of these servo gate pulse $P_G$ and sector mark signal $S_{SC}$ are substantially and completely synchronized with timings of the servo incoming signal $S_S$ and the data signal $S_D$ in the reproduced output $S_{OUT}$, thus making it possible to realize an extremely precise timing control.

In this instance, since the timing signal $S_T$ is clearly discriminated from the data signal $S_D$ by identifying the pulse signal $S_P$, it is possible to securely detect such a timing signal $S_T$.

In addition, even if the fall timing of the pulse signal $S_P$ unwillingly deviates to some degree, the fall timing of the output detected $S_{DE}$ relative to the fall timing of the pulse signal $S_P$, is kept unaffected, thus making it possible to carry out secure and precise extraction of the servo signal $S_S$ and demodulation of the data signal.

Figure 13:
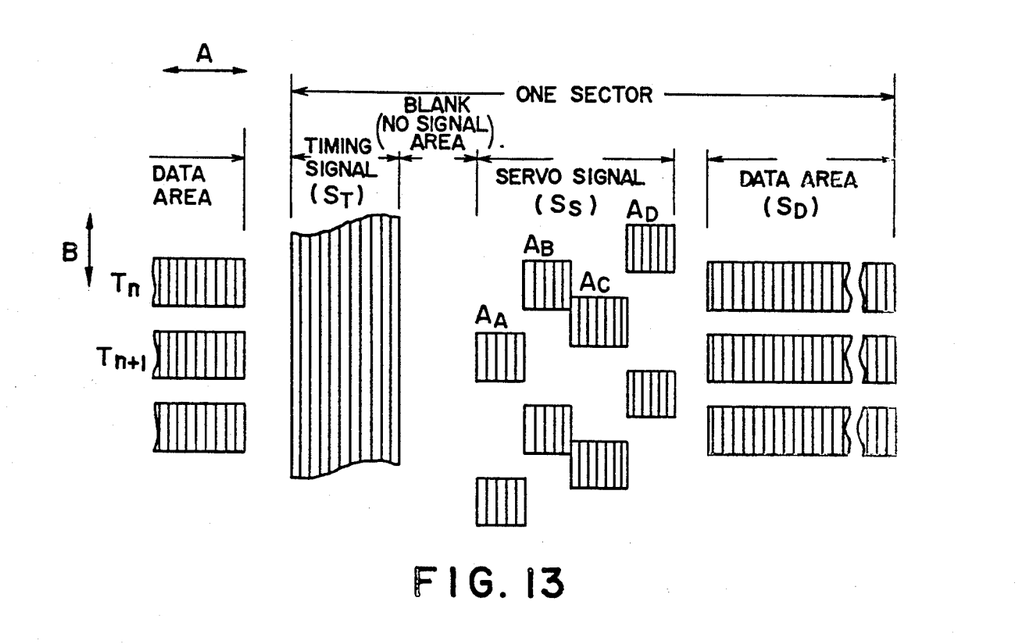
FIG. 13 is an explanatory view showing characteristics of a signal recorded on the disk surface by a sector servo system according to the present invention.

In the foregoing description for the recording and reproducing controls according to this invention, as shown in FIG. 13, bursts of the servo signal $S_A$, $S_B$, $S_C$ and $S_D$ having a common single frequency are recorded in four areas $A_A$, $A_B$, $A_C$ and $A_D$ ranging over two tracks $T_n$, $T_n+1$ adjacent each other in a radial direction and shifted to each other in a circumferential direction, respectively. Since such a technique is disclosed in detail in Japanese Patent Laid-Open Publication No. 62-246184 which was laid open after the priority date of this application, detailed description is omitted here.

It is to be noted that servo signal $S_S$ in the above-mentioned embodiment are four time divisional burst signals, but time divisional burst signals above or below four, or those burst signals having different frequencies may be employed.

Figure 14:
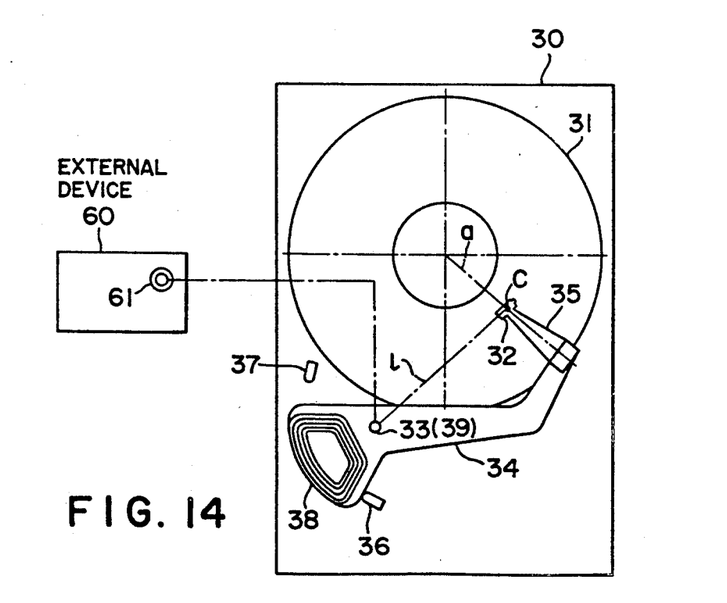
FIG. 14 is a schematic plan view showing an access mechanism of a disk drive used in this invention.

FIG. 14 shows an access mechanism of a magnetic disk drive used for realizing a timing signal recording method according to this invention.

In the magnetic disk drive according to this embodiment, a magnetic disk 31 accommodated within a case 30 is adapted to be revolved at a high speed by a spindle motor (not shown) and is also adapted to be intermittently driven from the outside of the magnetic disk drive by a predetermined angular position.

The magnetic head 32 is secured onto the front end of the head arm 34 rotatable about the pivot 33 through a gimbal arm 35. By intermittently rotationally driving this head arm 34, it is possible to intermittently move the magnetic head 32 at a predetermined pitch in a radial direction of the magnetic disk 31.

In this embodiment, an adjustment of a mounting angle of the magnetic head 32 has been made in advance for allowing the yaw angle to be within a predetermined value. Thus, such an adjustment provides an arrangement such that a line l, connecting the center C of the read/write gap of the magnetic head 32 and the pivot 33, and the read/write gap are not always perpendicular to each other.

The rotational range of the head arm 34 is limited by two stoppers 36 and 37. Thus, the movement range of the magnetic head 32 is limited.

At the opposite side of the head arm 34 to the head, a voice coil 38 constituting a voice coil motor is provided. By suitably controlling an access signal delivered to the voice coil 38, it is possible to change a feed quantity per each access of the magnetic head.

In the case of recording timing signals $S_T$ with the magnetic disk drive as constituted above, the magnetic disk 31 is first caused to be stopped at a predetermined angular position.

Figure 15:
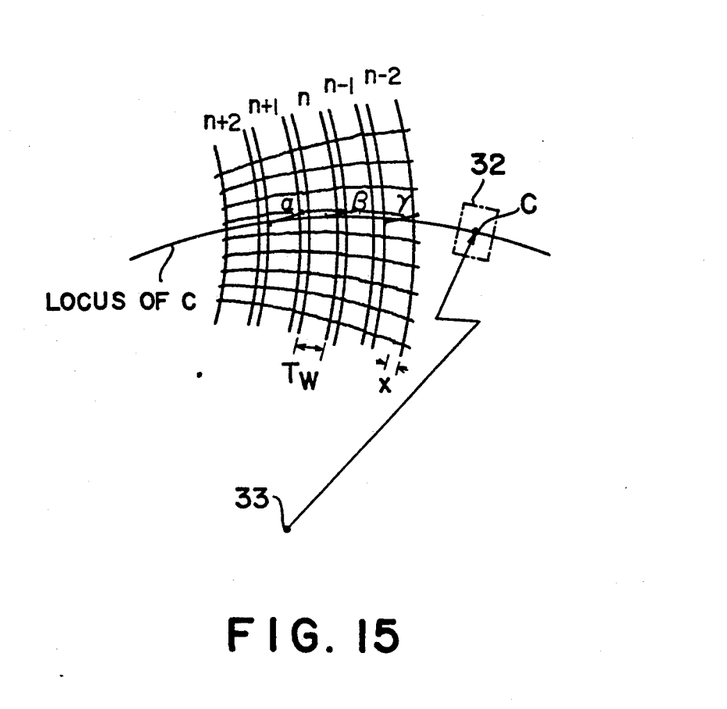
FIG. 15 is an explanatory view showing the manner of recording timing signals in accordance with this invention.

Then, as shown in FIG. 15 the magnetic head 32 is incrementally moved by a predetermined quantity x smaller than the track width $T_W$ to deliver timing signal $S_T$ to the magnetic head 32 at respective stop positions, thus to conduct a recording.

In order to move the magnetic head 32 incrementally at the predetermined quantity x, an external device 60 having a stepping motor and a coupler 61 is mechanically coupled to a shaft 39 provided at the pivot 33, the external device by itself generates and causes a necessary angular displacement of the shaft which corresponds to the predetermined quantity x. The displacement is repeated.

Thus, timing signals arranged in succession in a radial direction are recorded as a magnetization inversion pattern as shown in FIG. 15.

Figure 16:
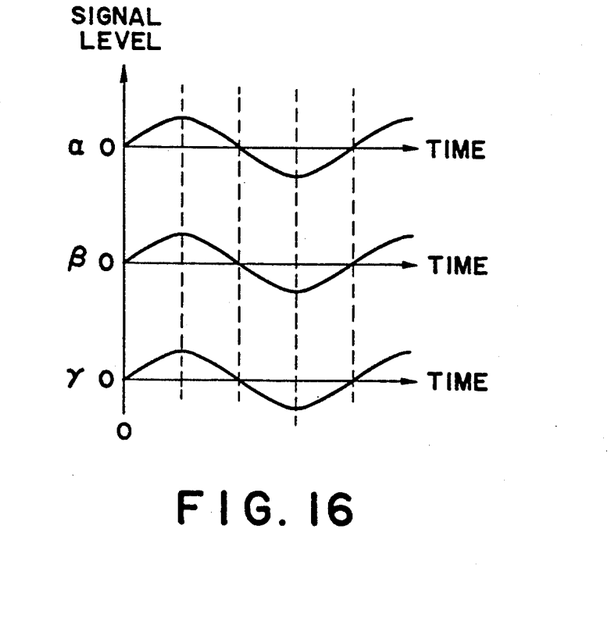
FIG. 16 is a waveform diagram showing how timing signals recorded as shown in FIG. 15 are reproduced.

The reproduced outputs of the timing signals $S_T$ thus prerecorded have the same phase and output level irrespective of the position of the magnetic head 32 as shown in FIG. 16.

When recording of timing signals $S_T$ is made with the magnetic disk apparatus according to this embodiment, even where the line l, connecting the center C of the read/write gap of the magnetic disc 31 and the pivot 32, and the read/write gap are not always perpendicular to each other, reproduced outputs of which phases and output levels are the same at all times irrespective of the position of the magnetic head 32.

In this case, it was found that it is preferable that the predetermined quantity x ranges from 1/10 to $\frac{1}{2}$, for example $\frac{1}{4}$, of the track width $T_W$ as a result of an experiment.

Namely, if the predetermined quantity x exceeds above $\frac{1}{2}$ $T_W$, uniformly reproduced outputs are difficult to obtain, whereas even if it is set to a value smaller than 1/10 $T_W$, the effect obtained cannot be further improved.

Figure 17:
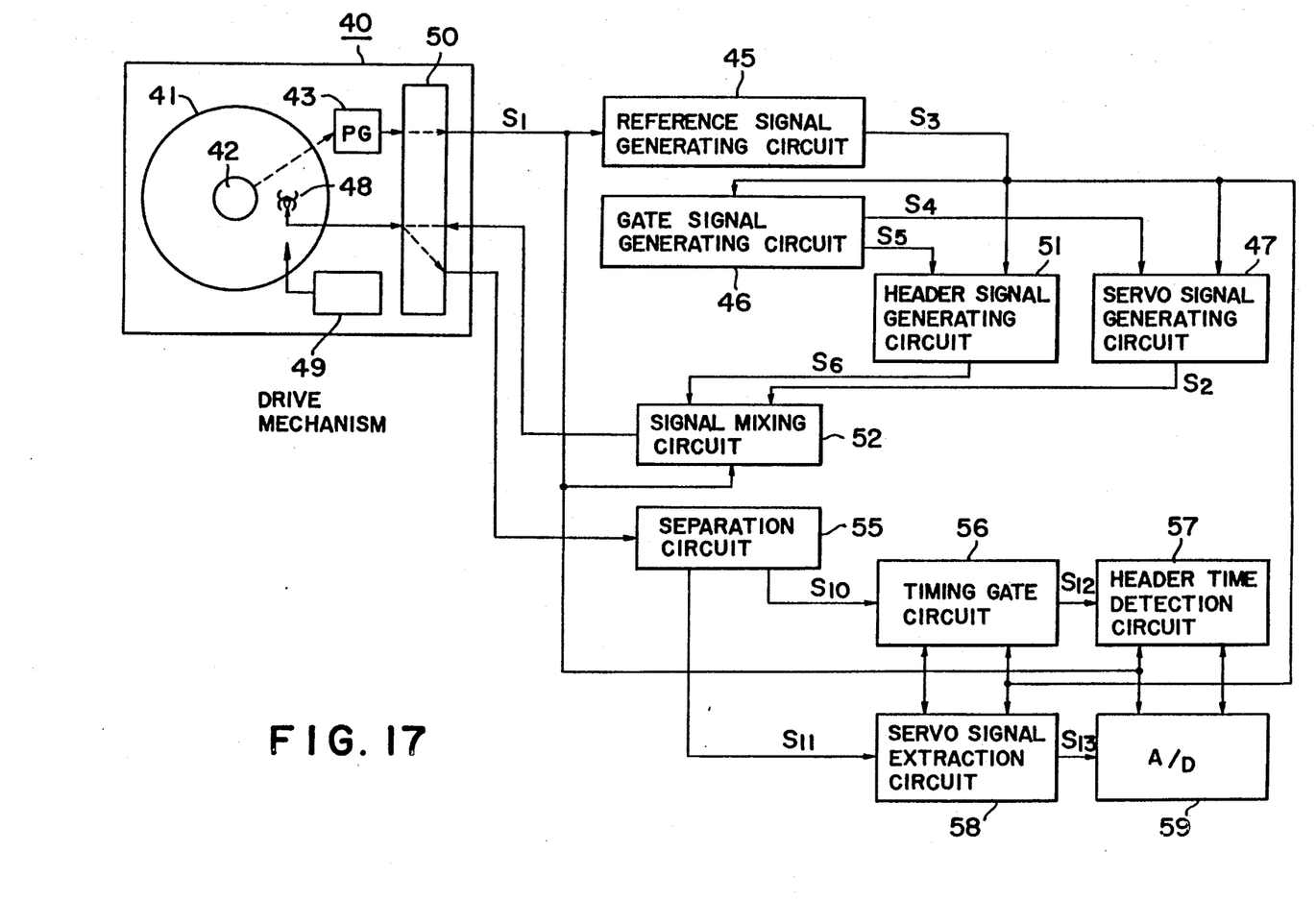
FIG. 17 is a block diagram showing an arrangement of a circuit for generating and recording timing signals.
Figure 18:
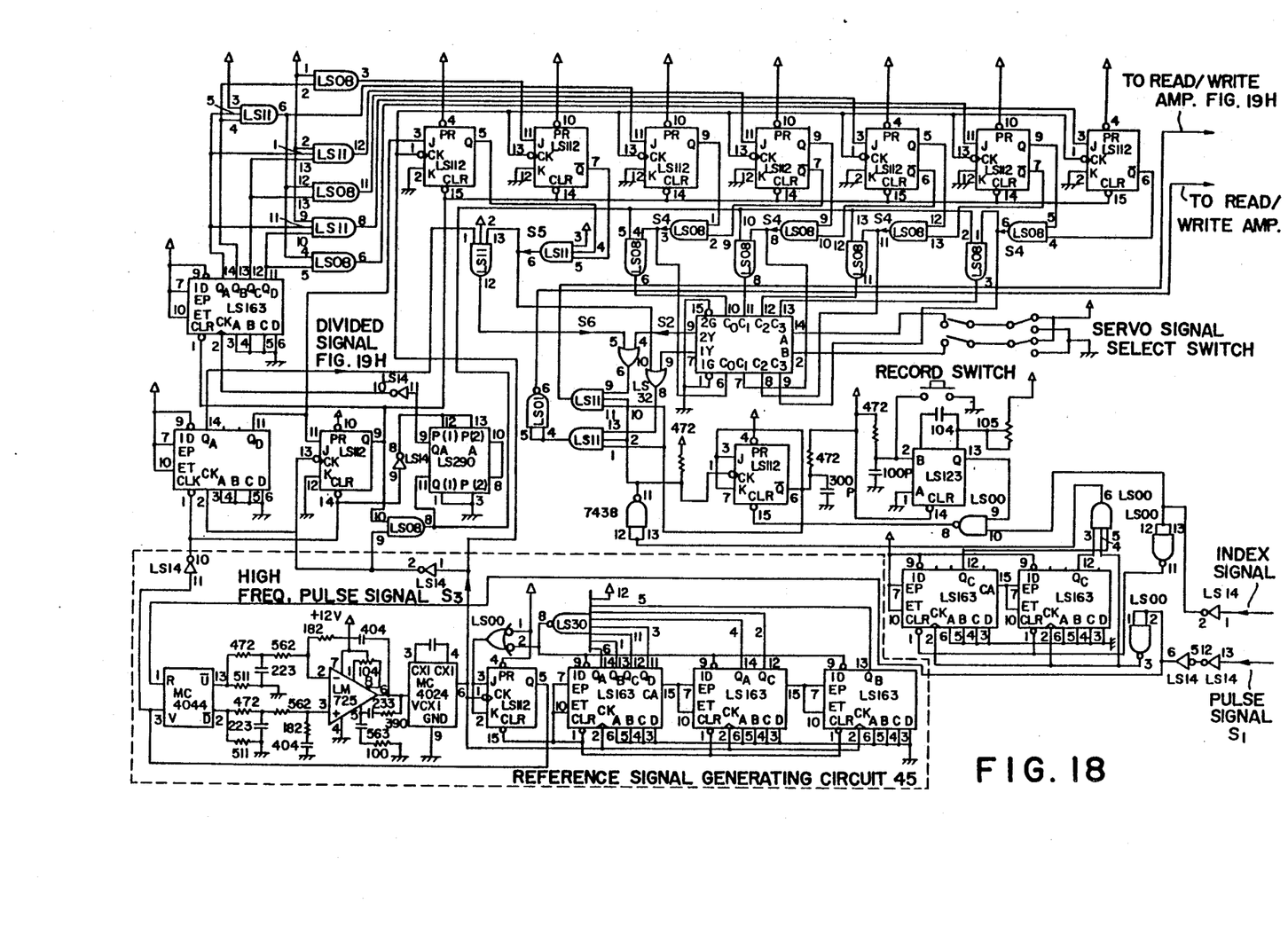
FIG. 18 is a circuit diagram showing the detail of the circuit shown in FIG. 17.

FIG. 17 is a block diagram showing an arrangement for generating and recording timing signals and FIG. 18 is a detailed circuit diagram corresponding to FIG. 17.

In FIG. 18, MC 4044 NAND RS LATCH and MC 4024 Binary Counter manufactured by Motorola are used for the reference signal generating circuit 51 and other components are ordinary TTL ICs.

This circuit serves to record servo signals $S_2$ for positioning of read/write head 48 onto respective data tracks $T_R$ of the magnetic disk 41 accommodated within the magnetic disk drive 40. The magnetic disk 41 Within the magnetic disk drive 40 is revolved by the spindle motor 42 at a predetermined speed and the read/write head 48 is moved in a radial direction of the magnetic disk 41 by a head drive mechanism 49.

Figure 19A:
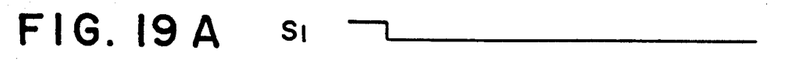
FIG. 19A through H is a waveform diagram showing waveforms at respective components in FIGS. 17 and 18.

Within the magnetic disk drive 40, a pulse generator 43 is provided, which generates a pulse signal (FG signal) $S_1$ as shown in FIG. 19A corresponding to revolution of the spindle motor 42. Such a pulse signal $S_1$ is also delivered to other equipment through an interface block 50.

It is to be noted that transmission and reception of servo signal $S_2$ and data signal to and from the read/write head are carried out through the interface block.

Figure 19B:
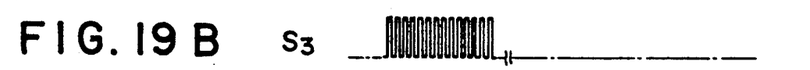

On the other hand, a servo signal recording apparatus of this embodiment which is used in the magnetic disk drive 40 as mentioned above is provided with a PLL circuit serving as a reference signal generating circuit 45 in this invention. This PLL circuit generates a high frequency pulse signal $S_3$ as shown in FIG. 19B based on the pulse signal $S_1$.

Figure 19C:
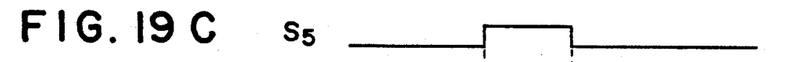
Figure 19D:
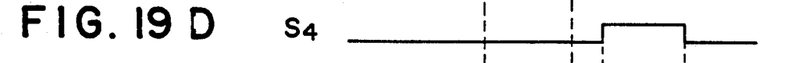

This high frequency pulse signal $S_3$ is delivered to the gate signal generating circuit 46. Thus, the gate signal generating circuit 46 generates a gate signal $S_5$ for header as shown in FIG. 19C and a gate signal $S_4$ for a servo signal as shown in FIG. 19D with the high frequency pulse signal $S_3$ serving as a clock signal to deliver these gate signals $S_5$ and $S_4$ to the header signal generating circuit 51 and the servo signal generating circuit 47, respectively.

Figure 19E:
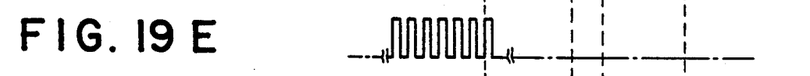
Figure 19F:
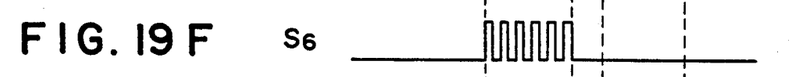

The header signal generating circuit 51 applies gate control to a frequency divided signal as shown in FIG. 19E generated based on the high frequency pulse signal $S_3$ by using the gate signal $S_5$ to output a header signal $S_6$ as shown in FIG. 19F.

It is to be noted that this header signal $S_6$ indicates the head of each sector.

Figure 19G:
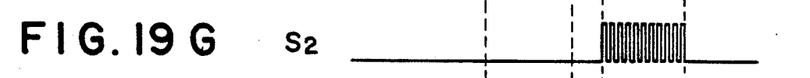

The servo signal generating circuit 47 applies a gate control to the high frequency pulse signal $S_3$ by using the gate signal $S_4$ to output a servo signal as shown in FIG. 19G.

Figure 19H:
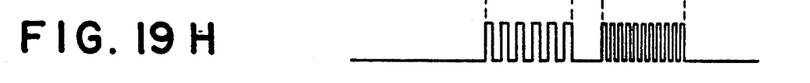

Then, these servo signal $S_2$ and header signal $S_6$ are delivered to a signal mixing circuit 52, at which they are combined as shown in FIG. 19H. The signal thus combined is delivered to a read/write amplifier for controlling a recording current signal for the read/write head 48 of the magnetic disk drive 40.

This magnetic disk apparatus 40 records the header signal $S_6$ and the servo signal $S_2$ on the magnetic disk 41 while step-feeding the read/write head 48 by using the drive mechanism 49 at a predetermined timing. Thus, these signals $S_6$ and $S_2$ are recorded in header regions and servo regions of respective data tracks Tn formed on the magnetic disk 41, respectively.

As just described above, in accordance with the signal recording apparatus according to this embodiment, servo signals $S_2$ can be recorded on respective data trackes Tn of the magnetic disk 41 without using an exclusive clock head, etc. on purpose.

In addition, since this servo signal $S_2$ is delivered through the interface block 50 of the magnetic disk drive 40, recording of the servo signal $S_2$ can be conducted under conditions where the magnetic disk drive 40 has been assembled customerly in the clean room. Thus, no additional clean room work for recording the servo signal is necessary after the drive 40 has been once assembled.

On the other hand, the servo signal recording apparatus according to this embodiment has a function to examine whether the header signal $S_6$ and the servo signal $S_2$ recorded as referred to above have been correctly recorded.

Figure 20A:
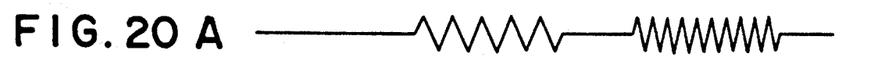

Namely, when an output subject to reproduction from the read/write head 48 is reproduced by the separation circuit 55 with the pulse signal $S_1$ serving as a trigger, a reproduced signal as shown in FIG. 20A is obtained.

Figure 20B:
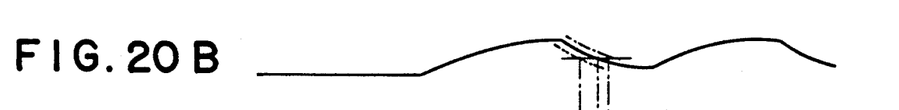

Further, the separation circuit 55 detects the reproduced signal to provide a detection signal as shown in FIG. 20B to output the detection signal being separated into a detection signal $S_{10}$ of the header signal and a detection signal $S_{11}$ of the servo signal.

Figure 20C:
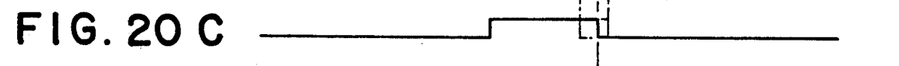

Then, the detection signal $S_{10}$ of the header signal is delivered to the timing gate circuit 56. Thus, the timing gate circuit 56 generates a gate signal $S_{12}$ having a pulse width as shown in FIG. 20C, which rises when the level of the detection signal $S_{10}$ is above a predetermined level, thus to deliver the gate signal $S_{12}$ to a header time detection circuit 57.

Figure 20D:
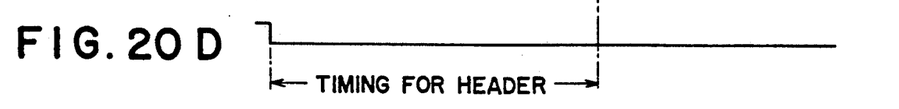
Figure 20E:
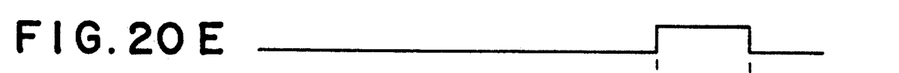

The header time detection circuit 57, as shown in FIG. 20D, detects a time from the rise of the pulse signal $S_1$ to the fall of the gate signal $S_{12}$. Thus whether or not the time is detected, i.e., header timing is proper, can be judged.

Figure 20F:
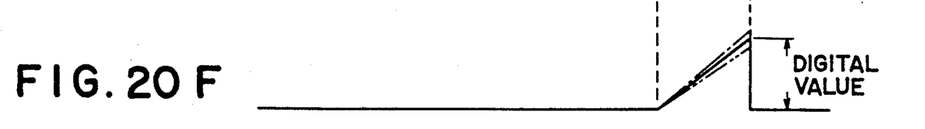

On the other hand, the reproduced signal of the servo signal is delivered to the servo signal extraction circuit 58. Thus, the servo signal extraction circuit 58 generates a gate signal $S_{12}$ having a fixed time delay from the fall of the pulse signal $S_1$ as shown in FIG. 20D to integrate the reproduced signal for a time period of the pulse width of the gate signal, thus to generate an integral signal $S_{13}$ as shown in FIG. 20F.

Then, the integral signal $S_{13}$ is delivered to an AD (analog-to-digital) conversion circuit 59, from which a digital value corresponding to the level of the integral signal $S_{13}$ is output.

Thus, whether or not the servo signal $S_2$ is correctly recorded can be judged on the basis of the level of the digital value.

As just described above, in accordance with the servo signal recording apparatus according to this embodiment, it is possible to confirm the recording condition of the servo signal $S_2$ and the header signal $S_6$.

What is claimed is:

1. A sector servo control timing signal recording system of a magnetic disk apparatus having a magnetic head which is moved over a magnetic disk while revolving in a radial direction of the disk to record data signals in tracks of the disk, the system comprising:

means for incrementally moving the magnetic head over the magnetic disk in the radial direction, the incremental move being performed with a predetermined feed quantity selected from 1/10 to ½ of a width of each track; and recording means responsive to the means for incrementally moving, for recording a sector servo control timing signal in each track, the recording being performed using the magnetic head.

2. A system as claimed in claim 1, wherein the recording means comprises:

means for generating a pulse signal corresponding to the revolution of the magnetic disk;

means for generating a high frequency pulse signal based on the pulse signal;

means for generating a gate signal based on the high frequency pulse signal;

means for extracting a signal portion from the high frequency pulse signal using the gate signal, thus the extracted signal portion becoming the timing signal.

3. A sector servo control magnetic apparatus having a magnetic head which is moved over a magnetic disk while revolving in a radial direction of the disk to record a modulated data signal in each sector of concentric tracks of the disk and having a recording system for recording a sector servo control timing signal and a servo signal in each sector, the apparatus comprising:

means for generating a pulse signal corresponding to the revolution of the magnetic disk;

means for generating a high frequency pulse signal based on the pulse signal;

means for generating two gate signals having different phases, based on the high frequency pulse signal;

means for extracting a first signal portion from the high frequency pulse signal using one of the gate signals, thus the extracted first signal portion becoming the timing signal;

means for extracting a second signal portion from the high frequency pulse signal using the other gate signal, thus the extracted second singal portion becoming the servo signal;

means for incrementally moving the magnetic head over the magnetic disk in the radial direction, the incremental move being performed with a predetermined feed quantity selected from 1/10 to ½ of a width of each track;

means, responsive to the incremental move, for continuously recording the timing signal in a first portion of each sector, the recording being performed using the magnetic head;

means for discontinuously recording the servo signal in a second portion of each sector following the first portion using the magnetic head;

means for recording the data signal in a third portion of each sector following the second portion using the magnetic head, thus the recorded timing, servo and data signals constituting successive signals in each sector;

means for reproducing the successive singals from each sector using the magnetic head;

means for detecting the timing signal from the reproduced successive signals based on the pulse signal;

means, responsive to the detected timing signal, for extracting the servo and data signals, respectively from the reproduced successive signals; and means for respectively demodulating the extracted servo and data signals, thus the demodulated servo signal being used for sector servo control.

* * * * *